United States Patent [19]
Rouillot

[11] Patent Number: 5,009,628
[45] Date of Patent: Apr. 23, 1991

[54] BODY HAVING A COMPOSITE STRUCTURE FOR A TRANSMISSION JOINT AND ITS METHOD OF PRODUCTION

[75] Inventor: Michel Rouillot, Lorraine, France

[73] Assignee: Glaenzer-Spicer, Poissy, France

[21] Appl. No.: 329,634

[22] Filed: Mar. 28, 1989

[30] Foreign Application Priority Data

Mar. 28, 1988 [FR] France ................................ 88 04045

[51] Int. Cl.⁵ ............................ F16C 3/00; F16D 3/26
[52] U.S. Cl. ..................................... 464/111; 464/181
[58] Field of Search ................ 464/111, 123, 124, 181, 464/905

[56] References Cited

U.S. PATENT DOCUMENTS

| | | |
|---|---|---|
| 2,194,798 | 3/1940 | Koppel. |
| 4,540,385 | 9/1985 | Krude ............................ 464/111 X |
| 4,681,556 | 7/1987 | Palmer ............................ 464/181 |

FOREIGN PATENT DOCUMENTS

| | | |
|---|---|---|
| 34073 | 8/1981 | European Pat. Off. . |
| 1046415 | 12/1958 | Fed. Rep. of Germany . |
| 1268917 | 6/1961 | France . |
| 2169450 | 9/1973 | France . |
| 2172580 | 9/1973 | France . |
| 2512140 | 3/1983 | France . |
| 2567222 | 1/1986 | France . |
| 2124735 | 2/1984 | United Kingdom ................ 464/181 |

Primary Examiner—Daniel P. Stodola
Assistant Examiner—William G. Battista, Jr.
Attorney, Agent, or Firm—Wenderoth, Lind & Ponack

[57] ABSTRACT

A body of a transmission joint includes bearing passageways arranged along the axis of the body and each including two confronting parallel raceways. The raceways are in the form of at least one metal insert. The inner space defined between the inner peripheral surface of the composite case and surfaces of the confronting raceways is filled with a composite organic filler material.

17 Claims, 7 Drawing Sheets

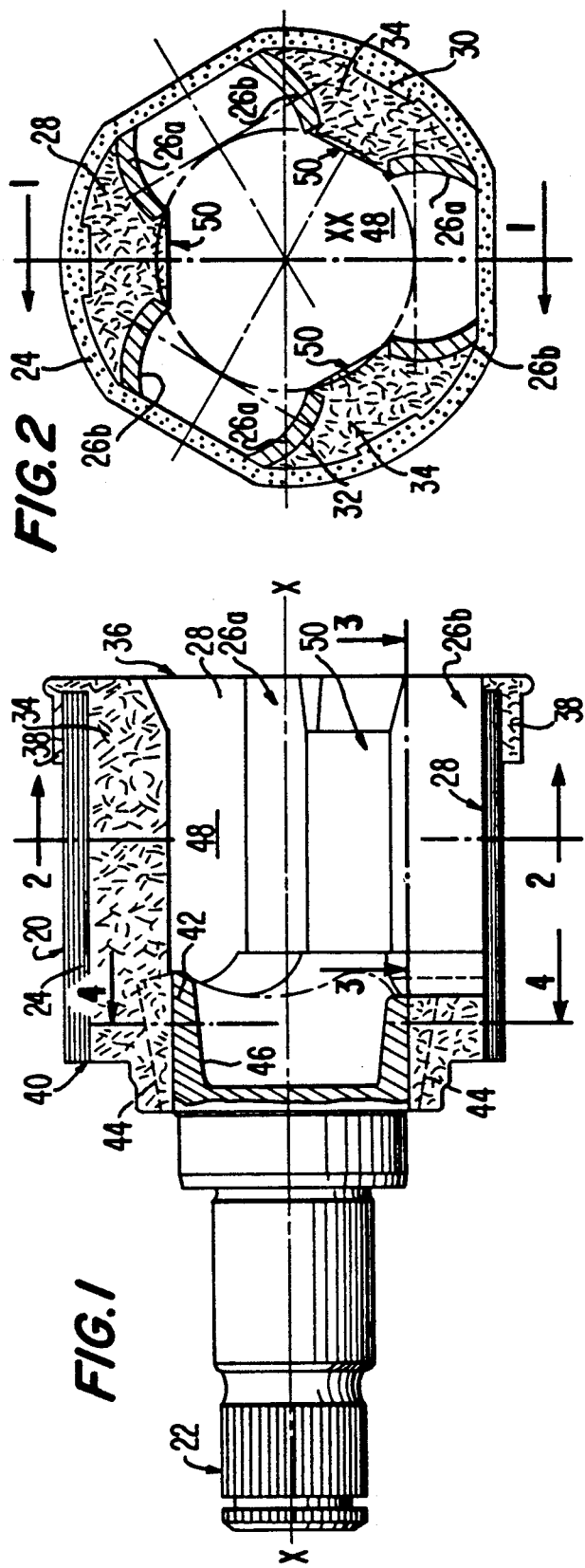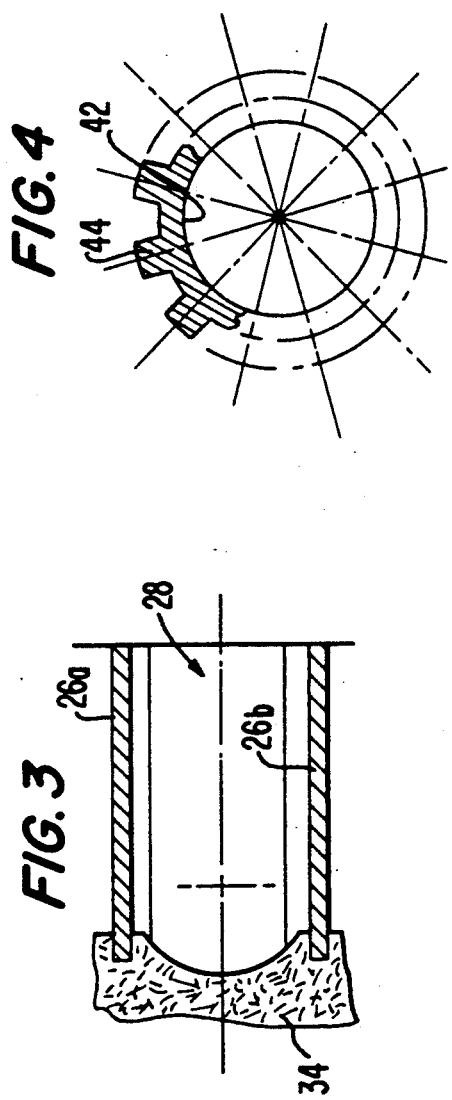

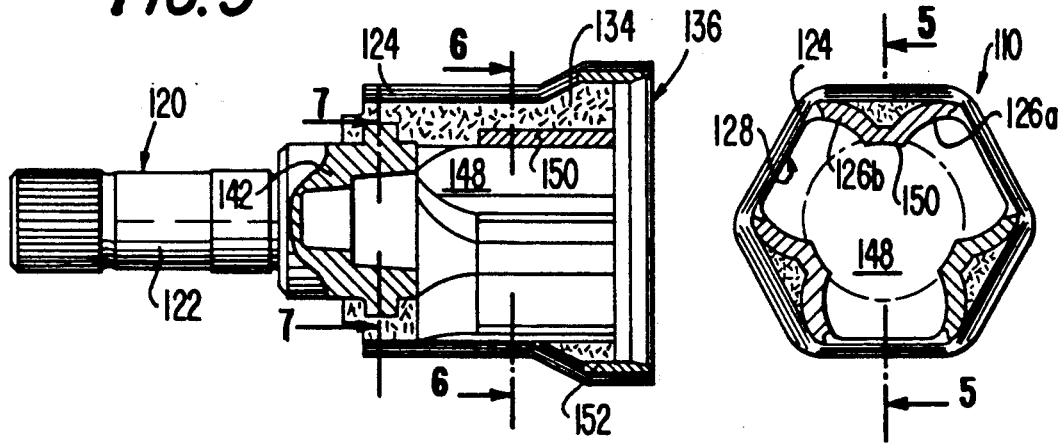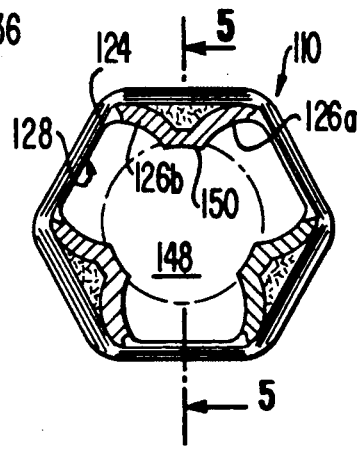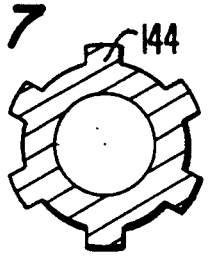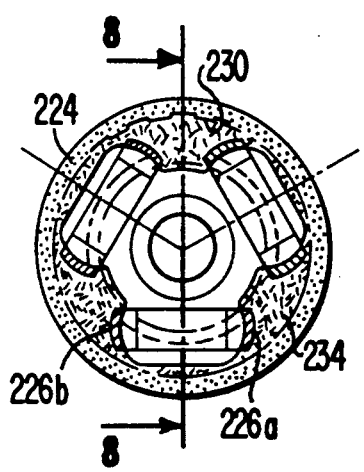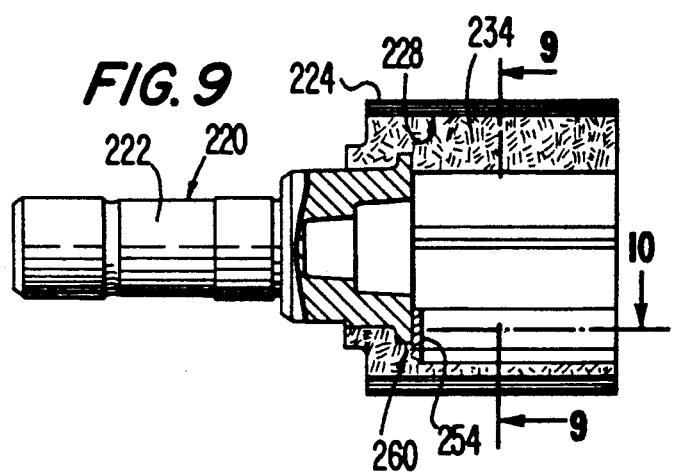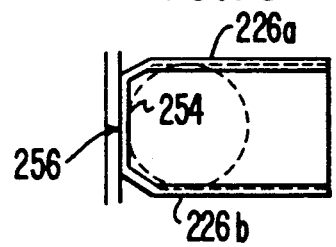

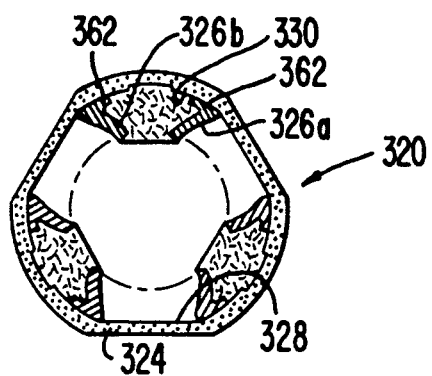
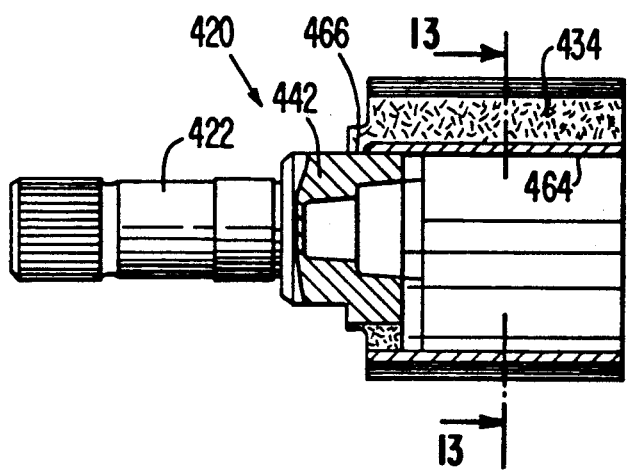 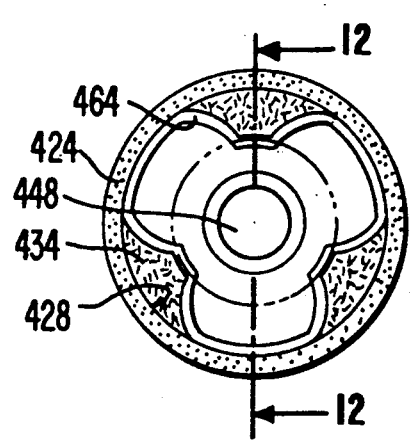

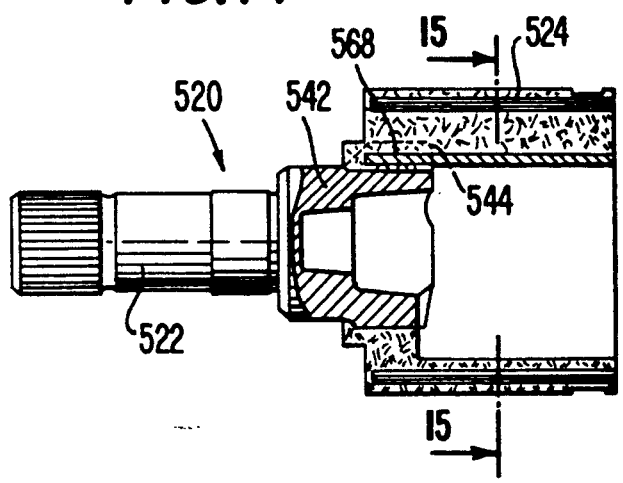
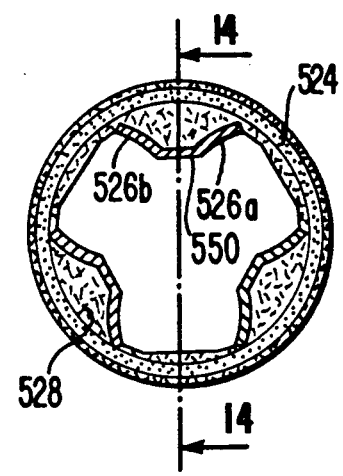
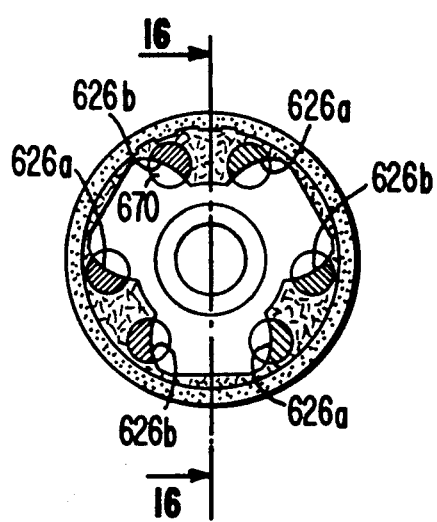
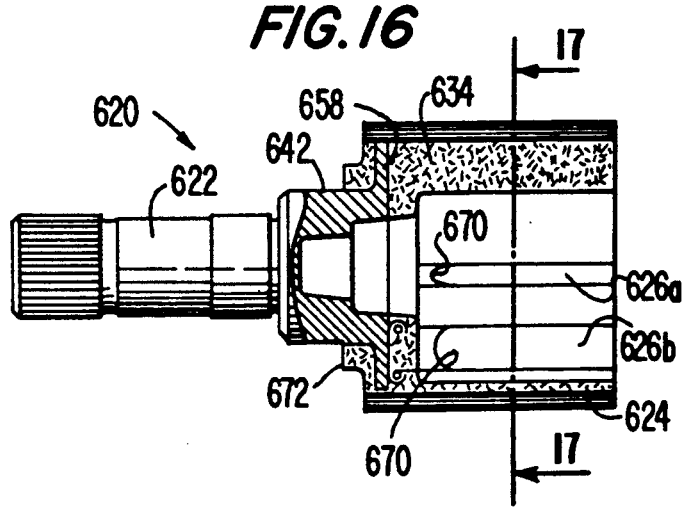

BODY HAVING A COMPOSITE STRUCTURE FOR A TRANSMISSION JOINT AND ITS METHOD OF PRODUCTION

BACKGROUND OF THE INVENTION

The present invention relates to a body of a transmission joint comprising a plurality of bearing passageways for articulation elements, arranged around the axis of the body and each comprising two raceways cooperative with articulation elements of the transmission joint, and a connection element for the body.

The invention concerns, in particular, a tulip element for a transmission joint comprising a plurality of rolling passageways arranged around the axis of the tulip element and each comprising two parallel confronting raceways, and a connecting element for connecting the tulip element to a shaft.

SUMMARY OF THE INVENTION

An object of the present invention is to provide a joint body which is integrated in an automobile vehicle transmission and, while retaining or improving its torque transmission capacities, achieves a particularly great reduction in weight and an improvement in the comfort of the vehicle while affording an improved filtration of the noises and vibrations appearing in the transmission and a very high resistance to corrosion.

U.S. Pat. No. 2,194,798 discloses a transmission joint body in which the bearing passageways are connected to the metal case of the body by an internal molding of an aluminium alloy. The necessity of casting an alloy whose melting temperature is higher than 500° C. results, under the thermal shock effects, in a deterioration of the mechanical and metallurgical properties of the metal inserts constituting the raceways. Furthermore, the casting operation at a very high temperature followed by a cooling does not guarantee with precision the dimensional characteristics and the functional tolerances required for a good operation of the transmission joint. The weight of such a transmission joint body is also still particularly high relative to the aforementioned requirements for a light weight transmission joint.

In order to overcome these drawbacks, the invention proposes a joint body wherein the connection system is connected to a case made from a composite material reinforced by continuous fibers and in which case are arranged said raceways in the form of at least one metal insert. The inner space radially defined by the inner peripheral surface of the case and by the confronting surfaces of the raceways is filled with a material constituted by a thermosetting or thermoplastic matrix reinforced with short fibers or particles.

According to other features of the invention:
the case is a cylinder whose directrix may have a substantially polygonal or circular shape;
the continuous fibers are angularly oriented relative to the axis of the tulip element;
a portion of the material extends over the outer peripheral surface of the case so as to form a functional surface for, in particular, fastening a sealing element or cap or for fixing an exterior component which is embedded in this portion to the case;
an end portion of the connection element is received in the material;
the end portion of the connection element has, on its outer surface, axial webs which project radially outwardly and are embedded in the material with which they cooperate for the transmission of the torque to the bearing passageways;
the webs are constituted by axial splines;
the end portion of the connection element axially defines the inner space and constitutes an inner end wall of the inner cavity of the body;
each raceway is constituted by a section of a metal section member;
each raceway is constituted by an independent insert;
two adjacent raceways of each two neighboring bearing passageways are interconnected by an inner longitudinal portion which is in one piece therewith so as to constitute an insert, each of the inserts arranged in this way being if desired connected to the other inserts by an outer longitudinal portion which is in one piece therewith so as to form a single insert;
the two confronting raceways of a bearing passageway are interconnected by an end transverse portion arranged in the inner end of the inner cavity, said transverse portion being if desired in one piece with the two raceways and bent at 90° to the latter.

The invention also provides a method for producing a body having the aforementioned features, said method comprising:
(a) disposing in an injection mold an outer case, the bearing passageways arranged in the form of at least one metal insert and the connection element;
(b) injecting the material in the inner space; and
(c) stripping the body formed in this way.

The invention also proposes a mold for carrying out the aforementioned method, which comprises an outer wall receiving the case and the connection element in portions having surfaces complementary thereto, a central core whose outer profile is complementary to the profile of the inner cavity of the body and which includes means for maintaining in position at least one metal insert, and a transverse closing wall axially defining said inner space. According to the invention the insert maintaining means are formed by at least one permanent magnet fixed to the core.

BRIEF DESCRIPTION OF THE DRAWINGS

Further features and advantages of the invention will be apparent from the following description made with reference to the accompanying drawings, in which:

FIG. 1 is an axial sectional view, taken along line 1—1 of FIG. 2, of a transmission joint body which, in this embodiment, is for example a tulip element of a tripod transmission joint;

FIG. 2 is a sectional view taken along line 2—2 of FIG. 1;

FIG. 3 is a partial sectional view taken along line 3—3 of FIG. 1;

FIG. 4 is a sectional view taken along line 4—4 of FIG. 1 of the end portion of the connection stem;

FIGS. 5, 6 and 7 are views similar to FIGS. 1, 2 and 4 of a second embodiment of a tulip element;

FIGS. 8, 9 and 10 are views similar to FIGS. 1, 2 and 3 of a third embodiment of a tulip element;

FIG. 11 is a view similar to FIG. 2 of a fourth embodiment of a tulip element;

FIGS. 12 and 13 are views similar to FIGS. 1 and 2 of a fifth embodiment of a tulip element;

FIGS. 14 and 15 are views similar to FIGS. 1 and 2 of a sixth embodiment of a tulip element;

FIGS. 16 and 17 are views similar to FIGS. 1 and 2 of a seventh embodiment of a tulip element;

DETAILED DESCRIPTION OF THE PREFERRED EMBODIMENTS

Figure 18:
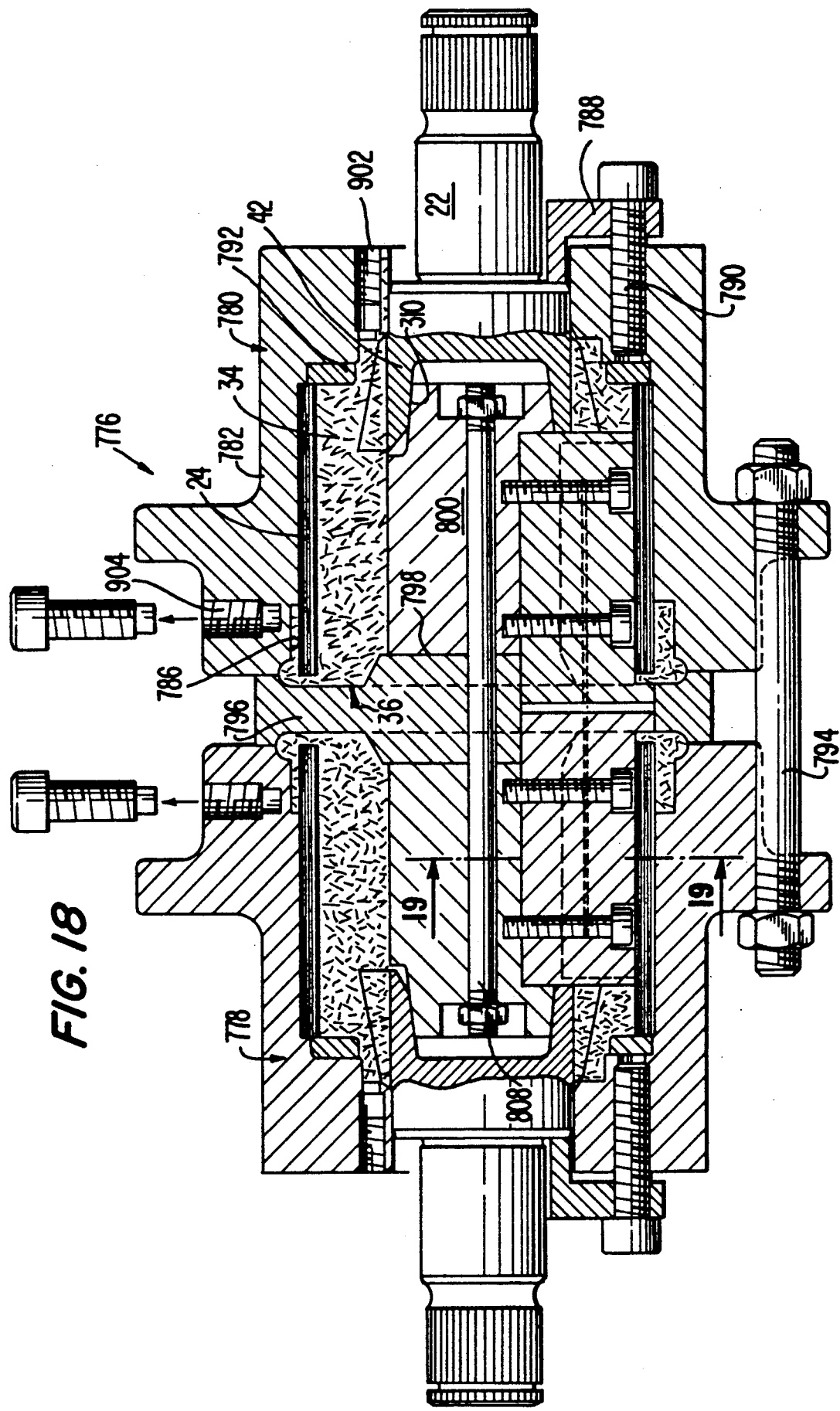
FIG. 18 is an axial sectional view, taken on line 18—18 of FIG. 19, of a mold in accordance with the invention for simultaneously producing two tulip elements according to the first embodiment shown in FIGS. 1 to 4.

FIGS. 1 to 4 show a tulip element 20 for a tripod joint comprising mainly a metal connection stem 22, a cylindrical case 24 coaxial with the axis X—X of the connection stem 22, and three rolling passageways angularly spaced 120° apart and each constituted by two parallel confronting raceways 26a and 26b.

Each raceway 26a, 26b is constituted by an independent metal insert which is a section of a curved metal section member.

As can be seen in FIG. 2, the outer case 24 is a cylinder whose directrix is an equilateral triangle whose angles are rounded and are inscribed within a common circle centered on the axis X—X.

The case 24 includes on its inner peripheral surface 28 three axial strips 30 which project radially inwardly and are angularly spaced 120° apart between two adjacent raceways of two neighboring rolling passageways.

The outer cylindrical case 24 is made from a composite material having an organic matrix reinforced by continuous fibers which may be angularly oriented relative to the axis X—X of the tulip element, for example at an angle of between 60° and 75°.

The inner space radially defined, on one hand, by the inner peripheral surface 28 of the case 24 and, on the other hand, by the confronting surfaces 32 of each of the metal inserts, is filled with a filler material 34.

The material 34 may be a thermosetting or thermoplastic resin reinforced with short fibers.

In the presently-described embodiment this material is a molded material injected into the tulip element by a method which will be described hereinafter, this material filling the inner space in such manner as to position and fix the metal inserts 26a and 26b in the outer case 24.

The radial front end face 36 of the tulip element (on the right as viewed in FIG. 1), is a planar face obtained by means of a corresponding wall of a mold which defines the inner space filled with the moulded material 34. However, as can be seen in FIG. 1, the mold material 34 may extend radially outwardly and partly cover the outer peripheral surface of the outer case 24 in a functional portion 38 which may act as a fastening means for a sealing element or a cap.

The portion of material 38 may serve to fix an exterior component (not shown) part of which is in the form of an insert which is partly or completely embedded in this portion of material. It may, for example, comprise a crenellated ring of a sensor for sensing characteristics of rotation of the transmission shaft equipped with the tulip element.

According to the shape of the mold, the overlapping portion 38 of the material may have a profile which is different from the outer profile of the case 24, for example a circular profile when the outer profile of the case is triangular.

The molded material extends in the inner space to the rear end radially planar face 40 of the tulip element and beyond (toward the left as viewed in FIG. 1) for surrounding the end portion 42 of the metal connection stem 22.

Indeed, according to the invention, the end portion 42 is received in the molded material for ensuring the transmission of the torque from the shaft to which the connection stem 22 is connected to the metal inserts 26a and 26b.

For this purpose, and as can be seen in FIG. 4, the end portion 42 comprises, at its peripheral surface, axial webs 44 which project radially outwardly and are tapered in a direction away from the open front face 36.

In this embodiment, the axial webs 44 are constituted by axial splines of the connection stem which may be produced by a drawing operation.

The cup-shaped inner profile 46 of the end portion 42 defines the inner cavity 48 of the tulip element for receiving the tripod element and its rolling elements.

The cavity 48 is radially defined by three portions of planar faces 50 extending parallel to the axis X—X and interconnecting the inner radial edges of two adjacent metal inserts of two neighboring rolling passageways.

The planar faces 50 are obtained by means of a corresponding shape of the production mold.

The triangular shape of the profile of the case 24, the strips 30 and the axial webs 44 together participate in the transmission of torque forces.

The metal inserts 26a and 26b may be very simply produced from a treated steel section member by cropping and cold forming.

The continuous fibers for reinforcing the case 24 participate in the transmission of the torque and prevent radial deformations of the tulip element.

The tulip element 110 shown in FIGS. 5 to 7 differs from the first embodiment just described in several respects.

As can be seen in FIG. 6, the two adjacent inserts 126a and 126b are interconnected by an inner longitudinal portion 150 which is in one piece with the two raceways and thus constitutes a metal insert.

Thus the tulip element only has three independent metal inserts which define the inner cavity 148 of the tulip element in cooperation with the inner peripheral surface 128 of the case 124.

As can be seen in FIG. 5, the outer case 124 is radially divergent in the vicinity of the end face 136 and is reinforced by an inner reinforcing member 152 which is also arranged in the form of a metal insert partly embedded in the molded material 134. The end portion 142 of the connection stem 122 also includes splines 144 which have a very short axial length.

The embodiment shown in FIGS. 8 to 10 differs from the first embodiment described with reference to FIGS. 1 to 4 in that the two inserts 226a and 226b defining the parallel raceways of the same rolling passageway are interconnected by a transverse end portion 254.

As can be seen in FIG. 10, the transverse end connection portion 254 is in one piece with the two raceways 226a and 226b so as to constitute a single metal insert. The tulip element arranged in this way therefore has only three independent metal inserts, i.e. one for each rolling passageway.

As can also be seen in FIG. 9, a greater number of strips 230 are here evenly spaced apart on the inner peripheral surface 228 of the case 224 and impart thereto a splined shape which still further enhances the torque transmitting capacity of the tulip element.

The axial positioning of each of the three inserts in the tulip element is ensured by the transverse end face 256 of the portion 254 which abuts against the confronting end face 258 of the connection stem 222. In order to facilitate the production of the tulip element, the inserts may be maintained in position with respect to the metal stem 222 by tack-welds 260 formed prior to the molding operation.

The embodiment shown in FIG. 11 differs from that of FIG. 2 with respect to the shape of each of the six independent inserts 326b and 326a, each of which includes a curved inner edge 362 which complements the shape of the inner wall 328 of the outer case 324 and which is embedded in the molded material.

In the embodiment shown in FIGS. 12 and 13, all of the raceways constituting the rolling passageways are in the form a single tubular metal insert 464 which radially defines the inner cavity 448 of the tulip element and, in cooperation with the inner peripheral surface 428 of the outer case 424, the inner space filled with the molded material 434.

The single metal insert 464 is welded by its radially inner portions to the outer peripheral surface 466 of the end portion 442 of the metal connection stem 422.

The embodiment shown in FIGS. 14 and 15 is very similar to that shown in FIGS. 5 to 7, but it is characterized by the fact that each of the three metal inserts includes a rear end portion 568 which extends axially between two axial webs 544 of the end portion 542 of the metal connection stem 522. This cooperation improves the transmission of the torque between the connection stem 522 and the raceways 526a and 526b.

In the embodiment shown in FIGS. 16 and 17, the raceways 626a and 626b are formed by two independent metal inserts partly imbedded in the molded material 634. Each metal insert is constituted by a cylindrical rod extending in a direction parallel to the axis of a tulip element the major part of each rod is machined from an inner end 670 to the open end of the tulip element for forming the raceway proper. The unmachined cylindrical rear end portion 672 extends axially through the molded material 634 and axially abuts against the radial end face 658 of the end portion 642 of the connection stem 622.

Each of the six small cylindrical rods may be welded to the end face 658.

According to variants (not shown), the stem may be replaced by another connection element, for example in the form of a hub, the flange of a toothed wheel . . . etc.

The essential function of the case is to limit the radial deformation of the joint subjected to torque. For this purpose, there must preferably be chosen a composite material reinforced with continuous fibers, these fibers being oriented between ±45° and ±90° relative to the principal axis of the joint (a characteristic value being ±70°), so as to obtain very high properties of resistance to bursting (500 to 800 MPa). When the joint is of great length (is required to slide a great distance), the fibrous reinforcement is optimized so as to achieve a good compromise between the resistance to bursting and the resistance to bending (reinforcing angle at about ±50° to ±60° relative to the principal axis of the joint).

The fibers are generally cheap glass fibers, but, if superior mechanical properties are required, other reinforcements may be employed, for example carbon fibers for increasing the rigidity, or aramide fibers for improving the resistance to shocks, and any other mixture of these various reinforcements.

The material of the matrix will be chosen in accordance with not only its mechanical performances but also its thermal performance, among conventional thermosetting resins (epoxy, polyester) or certain thermoplastic resins (polyester, polyamides . . . ).

The proportion of fiber reinforcement will be high, namely about 60% by volume.

The voluminal weight of the case will usually be around 2,000 kg/cu. m.

The filling has two essential functions: to transmit the forces between the raceways and the case on one hand, and, on the other hand, to transmit the torque in the region of the connection with the connection stem.

In order to obtain good properties when subjected to compression and sheer stress, a polymer material may be employed, reinforced in an isotropic manner with short and preferably injectable fibers in order to facilitate the manufacturing thereof. The thermoplastic matrices are of particular interest owing to their short production cycles. There may be mentioned as an example thermoplastic polyester polyamides, the choice being made from a compromise between cost and mechanical and thermal performances.

These matrices may be modified by the addition of elastomers, or metal particles in accordance with complementary properties (need for absorbing or conducting heat).

The fibrous reinforcement will be preferably of glass and the length of the fibers, usually 3 to 10 mm, will depend on both the required properties and the operating conditions.

The voluminal weight of the filler material will be around 1,600 kg/cu. m.

Figure 19:
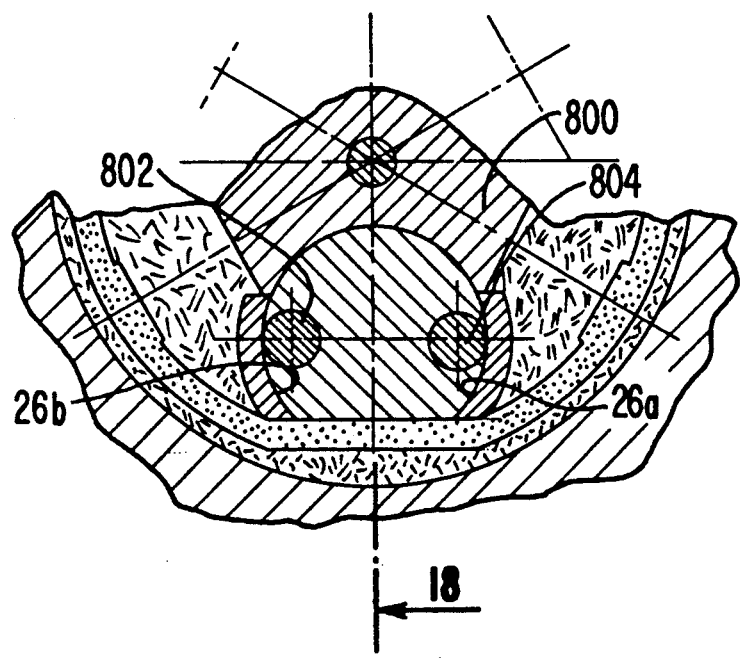
FIG. 19 is a partial sectional view taken along line 19—19 of FIG. 18.

FIGS. 18 and 19 show an injection mold 776 in two parts 778 and 780 whereby it is possible to simultaneously produce two tuplip elements according to the teaching of the invention.

The mold which will now be described is not a mold permitting mass production but a prototype mold which will explain the general architectural principles of the mold and of the construction of the tuplip elements.

Each of the two mold parts 778 and 780 is mainly constituted by an outer mold wall 782 including an inner profile 784 which is complementary, on one hand, to the outer profile of the case 24 and, on the other hand, to the outer profile of the rear part of the end portion 42 of the connection stem 22.

The front part of the mold wall 782 comprises an inner surface 786 of a shape which is complementary to the shape of the functional portion 38 it is desired to provide on the outer peripheral surface of the case 24.

The mold part 780 comprises an end plug 788 for maintaining the connection stem 22 axially in position in the mold and which is connected to the body of the mold by three screws 790 which bear against an annular ejecting ring 792.

The two mold parts 778 and 780 are interconnected by screw-threaded rods 794 so as to clamp therebetween an intermediate radial wall 786 whose lateral surfaces 798 define the profile of the front face 36 of each of the two tulip elements.

According to the invention, the inner core 800 of each of the two mold parts which has an outer profile complementary to the profile of the inner cavity of the tulip element it is desired to produce, comprises in its lower part permanent magnets 802 and 804.

The permanent magnets 802 and 804 are arranged, as shown in FIG. 19, in such manner as to maintain in position by magnetic attraction the two lower inserts 26a and 26b prior to the injection of the molded material 34 through an injection orifice 902.

Each mold part includes a radial orifice 904 for verifying the correct filling of the mold by the molding material 34 and for venting air during the molding operation.

The molding operation comprises the following steps:

first, placing all of the metal inserts in position on the central core 800 with respect to which they are maintained in position by the effect of the permanent magnets 802 and 804;

after having placed the ejection ring 792 in position, placing the composite outer case 24 into the mold part in abutment with the ring 792;

placing in position the metal stem which is guided in its corresponding part of the wall of the mold 784;

clamping the member 788 by means of screws 790;

thereafter placing in position the core 800 and the intermediate wall 796 with the central rod 808, then closing the two mold parts by means of the rods 794.

When all of these operations of positioning and assembly have been completed, the molding material 34 is then injected through the orifices 802 until the mold is perfectly filled.

Stripping the parts from the mold is effected by first of all separating each of the two mold parts and then removing the clamping member 788. The screws 790 are then again screwed into the corresponding tapped holes so as to exert a thrust on the ejection ring 798 which causes the ejection of the molded tulip element out of its mold part.

During the molding operations a seal is achieved by a cone-to-cone cooperation of the inner profile of the end portion 42 of the connection stem 22 with the corresponding end cone 810 of the core.

Figure 20:
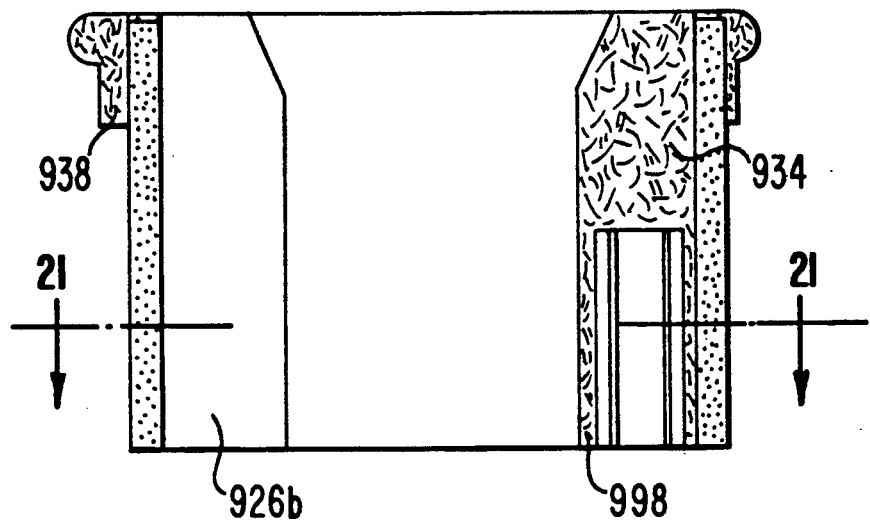
FIGS. 20 and 21 are views similar to FIGS. 1 and 2 of an eighth embodiment of a tulip element without an integrated connection stem.
Figure 21:
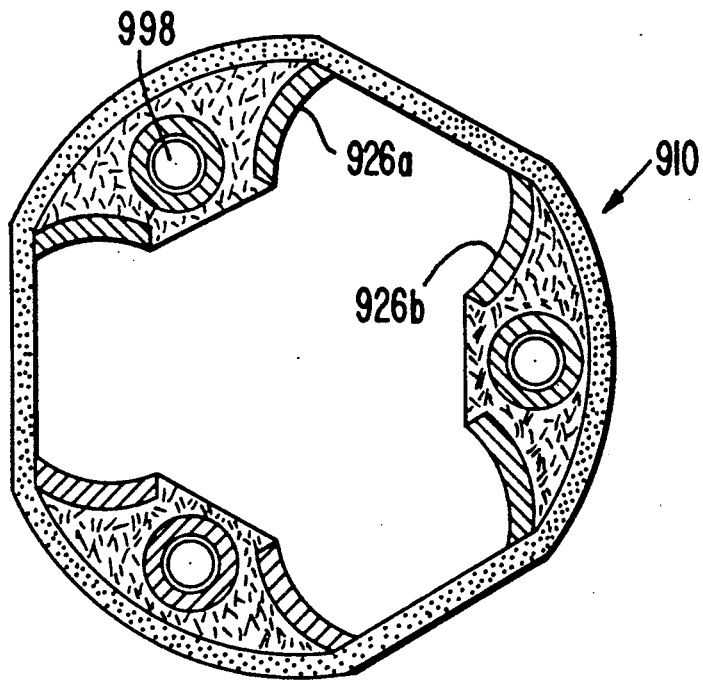

In the embodiment shown in FIGS. 20 and 21, the shape and the structure of the tulip element 910 are very similar to those shown in FIGS. 1 and 2, and in particular with respect to the arrangement of the independent inserts 926a and 926b.

However, in this embodiment, the end of the connection stem (not shown) is not embedded in the molded material 934. The latter indeed receives three tapped axial metal inserts 998 which are embedded in the reinforced organic matrix and which permit the subsequent connection of a connection stem by bolting.

I claim:

1. A body of an articulated transmission joint comprising:
   a case having an inner peripheral surface extending about an axis of rotation of the body, said case being formed of a composite material including continuous reinforcing fibers;
   connecting element means forming an integral part of the body for connecting the body to a part of a power transmission system;
   at least one metal insert disposed within said case and defining a plurality of passageways, each constituted by a pair of confronting raceways, for receiving an element of the transmission joint which is to be articulated to the body,
   said passageways being spaced from one another at angular intervals about said axis of rotation;
   said at least one metal insert including wall portions having, on one side thereof, said confronting raceways and, on the other side thereof, confronting surfaces defining an inner space with the inner peripheral surface of said case; and
   a matrix material occupying said inner space and integrating said at least one metal insert with said case,
   said matrix material comprising one of a thermoplastic and thermosetting resin, and reinforcing means consisting of one of short fibers and particles for reinforcing the resin.

2. A body according to claim 1, wherein the case has curved portions lying in a cylindrical envelope.

3. A body according to claim 2, wherein the directrix of the case is substantially polygonal.

4. A body according to claim 2, wherein the directrix of the case is a circle.

5. A body according to claim 1, wherein the continuous fibers are angularly oriented relative to said axis.

6. A body according to claim 1, wherein a portion of said matrix material extends on an outer peripheral surface of the case.

7. A body according to claim 6, wherein said portion of said matrix material forms a functional surface for supporting an additional element on the body.

8. A body according to claim 1, wherein said connecting element means has an end portion which is received in said matrix material.

9. A body according to claim 8, wherein the end portion of said connecting element means has an outer cylindrical surface, and axial webs provided on said outer cylindrical surface projecting radially outwardly and embedded in said matrix material with which they cooperate for the transmission of torque to said raceways.

10. A body according to claim 9, wherein said webs are constituted by axial splines.

11. A body according to claim 1, wherein the body has an inner cavity defined therein radially inwardly of said passageways and said matrix material, and said connecting element means has an end portion which extends axially and also defines said inner space and constitutes an axial end wall of the inner cavity of the body.

12. A body according to claim 1, wherein each said pair of confronting raceways is constituted by one said metal insert.

13. A body according to claim 1, wherein said at least one metal insert comprises independent metal inserts each defining a respective one of said raceways.

14. A body according to claim 1, wherein said at least one metal insert has an inner longitudinal part which interconnects respective said wall portions, at radially innermost ends thereof, of raceways constituting adjacent said passageways.

15. A body according to claim 14, wherein said at least one insert has an outer longitudinal part constituting one piece with each of said wall portions and connected thereto at radially outermost ends of said wall portions.

16. A body according to claim 1, wherein said at least one metal insert includes a transverse end portion extending at an axially inner end of the body and interconnecting said wall portions.

17. A body according to claim 16, wherein the transverse end portion is in one piece with the wall portions and is bent at 90° relative thereto.

* * * * *